Figure 1:
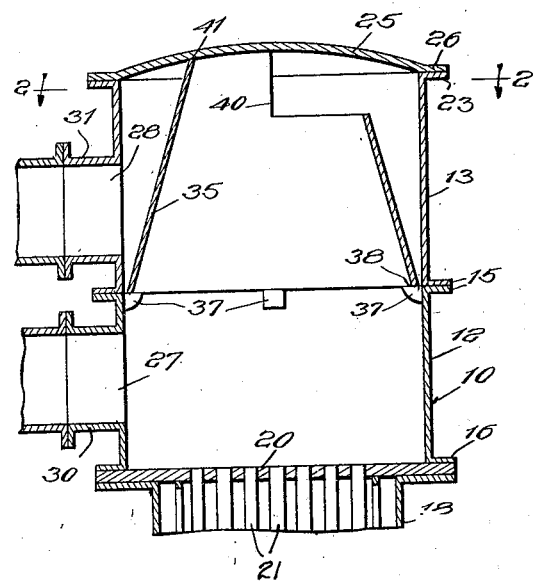

May 17, 1932.  T. RAY ET AL  1,858,842

SEPARATOR

Original Filed Jan. 18, 1928

Inventors:
Joshua R. Ray
Thomas Ray

Witness:
William P. Kilroy

By Hill & Hill Attys

Patented May 17, 1932

1,858,842

UNITED STATES PATENT OFFICE

THOMAS RAY AND JOSHUA R. RAY, OF MANISTEE, MICHIGAN

SEPARATOR

Original application filed January 18, 1928, Serial No. 247,542. Divided and this application filed June 10, 1929. Serial No. 369,866.

Our invention has to do with separators and relates more particularly to such devices which are especially adapted for use in conjunction with evaporating systems.

An object of our invention is to provide a device of the type referred to which is adapted to receive moist vapor from a heater or evaporator and to separate the entrained moisture from such vapor, directing the vapor and separated moisture into separate channels.

Another object is to provide such a device which will be simple in construction, inexpensive to manufacture, highly efficient and durable.

Other objects and advantages of the construction herein shown and described will be obvious to those skilled in the art from the disclosure herein given.

To this end our invention consists in the novel construction, arrangement and combination of parts herein shown and described, and more particularly pointed out in the claims.

Figure 2:
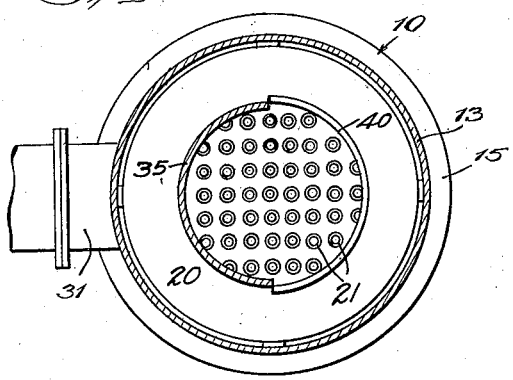

Referring now to the drawings forming a part of this specification and illustrating a preferred embodiment of our invention:

Fig. 1 is a vertical sectional view taken through a device embodying our invention with a portion of a heater shown fragmentarily; and Fig. 2 is a sectional view taken substantially on the line 2—2 of Fig. 1.

The separator indicated generally at 10 comprises a lower casing 12 and an upper casing 13, both of these casings being substantially cylindrical and secured together by means of annular flanges 15. The lower casing 12 has an outstanding annular flange 16 which serves to connect this casing with a heating device 18. The heating device 18 may be of any suitable type but is preferably of a type such as is described and claimed in our copending application Serial No. 374,552, filed June 28, 1929. A plate 20 disposed between the heater 18 and the casing 12 receives a plurality of tubes 21, and provides communication between such tubes and the separator 10.

The upper casing 13 is flanged as at 23, so as to seat a cover 25 which is preferably circular, with an annular flange 26 adapted to make a fluid tight engagement with the flange 23, and may be removable. The two casing members 12 and 13 are apertured on their sides, as at 27 and 28, respectively, and have suitable outlet members 30 and 31 adapted to communicate with suitable conduits. Arranged within the upper casing 13 is a vapor bonnet 35 which is formed out of sheet material and is frusto-conical in form, converging towards its upper extremity. This bonnet is conveniently supported by lugs 37 or other suitable means adjacent the juncture between the casing members 12 and 13, and is arranged so that its lower edge 38 is spaced from the inner wall of the casing member 13. Adjacent the upper extremity of the bonnet 35 the wall thereof is cut away, as at 40, the cutaway portion being preferably on the side of the bonnet opposite the opening 28 in the casing member 13 and may be of any suitable extent, though preferably extending through substantially the semiperiphery of the bonnet. Except for the cutaway portion 40, the bonnet extends upwardly to and meets the cover member 25, as at 41.

The operation of the device is substantially as follows: Assuming that a liquid has been forced up under considerable pressure through the heating member indicated fragmentarily at 18, having passed upwardly through the tubes 21 which are surrounded by steam, the liquid will issue from the tube into the lower casing member 12 of the separator 10 in the form of a wet vapor. The vapor and entrained liquid will tend to spurt upwardly against the inner wall of the vapor bonnet 35 and, as a result of its impinging against this surface, much of the entrained liquid will be separated. Further separation will occur as the vapor passes through the opening 40 in the bonnet and is forced to change its direction in order to reach the outlet 28. It will be readily apparent that, as the moist vapor impinges against the edges of the walls of the bonnet member 35 around the opening 40, much of the entrained moisture will be dropped. Some moisture collects on the inner wall of the upper casing 13 and on the outer wall of the vapor bonnet and flows downward and returns to the lower casing 12 through the space provided between the lower edge 38 of the bonnet and the inner wall of casing 13. Hence liquid may easily flow from the lower casing 12 through the outlet member 30 to any convenient point while the vapor, which has been effectually separated from entrained moisture, may be drawn out through the outlet member 31 to a condenser or other suitable apparatus.

This application represents a division of our copending application Serial No. 247,542, filed January 18, 1928.

What we claim as new and desire to secure by Letters Patent is:

1. In a device of the class described, a casing member having an inlet opening for the introduction of moist vapor, a steam outlet opening adjacent the upper portion thereof and out of the direct path of such vapor, and a liquid outlet opening adjacent the lower portion thereof, and a baffle disposed between the steam and liquid outlet and opposite said inlet opening whereby such vapor may impinge thereagainst.

2. In a device of the class described, a casing having an opening for the introduction of moist vapor, a vapor outlet adjacent the upper portion thereof out of the direct path of vapor, a liquid outlet adjacent the lower portion thereof, and a frusto-conical baffle member disposed within said casing and dividing said casing into upper and lower chambers, said baffle member having its walls converging in the direction of flow of the moist vapor from said inlet opening, and spaced throughout substantially its entire extent from the inner wall of said casing to permit the flow of fluid therebetween and from one chamber to the other.

3. In a device of the class described, a casing having an opening for the introduction of moist vapor, a vapor outlet adjacent the upper portion thereof out of the direct path of vapor, a liquid outlet adjacent the lower portion thereof, and a frusto-conical baffle member arranged adjacent one end of said casing and disposed entirely within said casing having its walls converging in the direction of flow of the moist vapor from said inlet opening, and spaced throughout substantially its entire extent from the inner wall of said casing to permit the flow of fluid and escape of liquid from between said casing and said baffle member into another portion of the casing, said baffle having an opening in the wall thereof, so disposed as to require vapor issuing therefrom to change direction in order to reach said vapor outlet.

4. In a device of the class described, a casing having an opening for the introduction of moist vapor, a vapor outlet adjacent the upper portion thereof out of the direct path of vapor, a liquid outlet adjacent the lower portion thereof, and a frusto-conical baffle member arranged at one end of said casing disposed coaxially with the casing within said casing having its walls converging in the direction of flow of the moist vapor from said inlet opening, and spaced throughout substantially its entire extent from the inner wall of said casing to permit the flow of fluid from between said casing and said baffle member into another portion of said casing, said baffle having an opening in the wall thereof disposed opposite the side of said vapor outlet.

In witness whereof, we hereunto subscribe our names this 29th day of May A. D., 1929.

THOMAS RAY.
JOSHUA R. RAY.